Sept. 8, 1931.  W. BAUERSFELD ET AL  1,822,076
ILLUMINATING ARRANGEMENT
Filed Feb. 17, 1928

Inventors:
Walther Bauersfeld
Hans Hartinger

Patented Sept. 8, 1931

1,822,076

UNITED STATES PATENT OFFICE

WALTHER BAUERSFELD AND HANS HARTINGER, OF JENA, GERMANY, ASSIGNORS TO THE FIRM CARL ZEISS, OF JENA, GERMANY

ILLUMINATING ARRANGEMENT

Application filed February 17, 1928, Serial No. 255,117, and in Germany March 2, 1927.

As is well known, as illuminating bodies for illuminating the field of operation and for similar purposes there are required such bodies as yield a very intense and simultaneously shadow-free light, i. e. which emit a pencil of luminous rays striking the field in such a way as if they had emerged from several sources of light, being in different positions relatively to the field. It has been tried to solve this problem by using one or several sources of light, i. e. by surrounding the sources of light with a collective optical system by means of which the luminous rays were transmitted to the field after the deflection on the reflecting inner surface of a conical casing enclosing the system.

However, the problem may be solved in a simple manner with the aid of an illuminating body, which is fitted with a concave mirror whose reflecting surface is a surface of rotation having a continuously curved meridional curve, and with an approximately punctiform source of light, disposed in the axis of rotation. Such an illuminating body will afford the desired distribution of light as soon as the luminous rays projected by the reflecting surface of the mirror and the said axis of rotation intersect in such a way that the luminous rays cover a finite length of the said axis. In this case the whole pencil of luminous rays, emitted by the illuminating body, has at one point the narrowest constriction of finite extension at which its circular cross section has the smallest diameter. This cross sectional surface shows the greatest intensity of illumination and can therefore be suitably used as a luminous field. Each point of this luminous field is illuminated by rays, which emanate from all meridians of the concave mirror. In this way the head and the hands of the operator in the luminous fields as well as the tools used, which generally do not simultaneously obstruct the access of all luminous rays, illuminating a point, to the luminous field, are prevented from casting an objectionable shadow.

Figure 1:
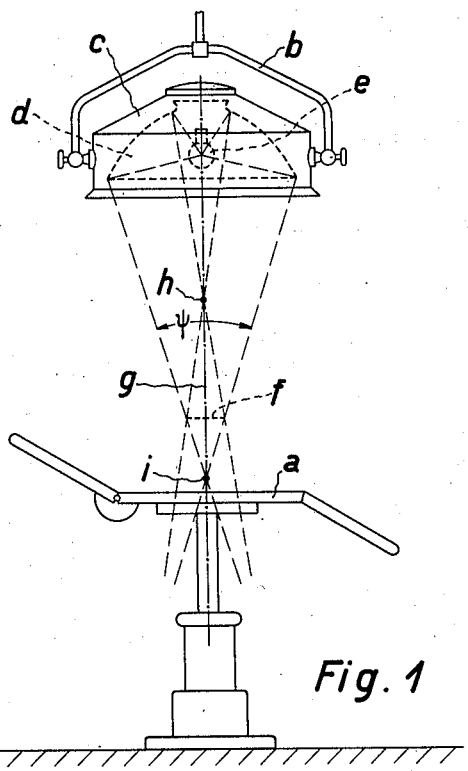
Figure 2:
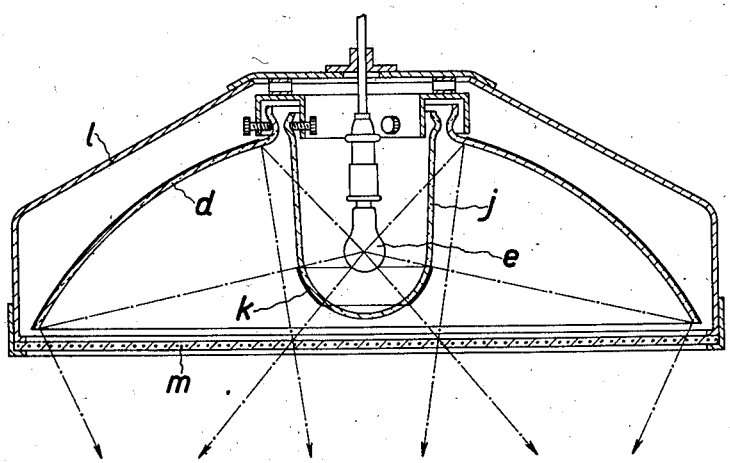

In the annexed drawings Fig. 1 diagrammatically shows an example of the invention in a front view. Fig. 2 shows in a section on an enlarged scale a further construction of certain definite details.

In Fig. 1 the illuminating body is suspended above an operating chair $a$ on a body $b$ and has a casing $c$ in which is located a concave mirror $d$. As a source of light serves a glow lamp $e$. The surface of the concave mirror $d$ is a surface of rotation. The diameter of the ray-exit-aperture of the concave mirror $d$ is about fourfold of the distance of the source of light from the vertex of the mirror, so that the pencil of luminous rays, reflected by the concave mirror $d$, has a comparatively large angle of aperture $\psi$. The light pencil whose marginal rays are shown in the drawing has above the operating chair $a$ the narrowest constriction $f$ whose cross section, a circular surface, is to be used as a luminous field. The rays, reflected by the elementary zones of the mirror $d$, are united on the axis $g$; the points of intersection of these rays cover a length $h\,i$ of this axis, determined by the marginal rays. Each superficial element of the surface $f$ receives reflected rays, which emanate from points of at least two meridians of the mirror $d$, situated on both sides of the glow lamp $e$. There also prevails an approximately equivalent illumination at some distance above and below the surface $f$. With a view to removing variations in the illumination, which, as a rule, are practically unavoidable owing to the spatial extension of all sources of light, it is advisable to choose a glow lamp with a light-dispersing bulb or to surround the bulb with a cover of frosted or opal glass, whereby a certain definite enlargement of the luminous field is also attained.

In Fig. 2 the mirror is again denoted by $d$ and the source of light (a glow lamp with clear bulb) by $e$. The glow lamp is enclosed by a cover $j$ of heat-absorptive glass in order to prevent that in the luminous field a great accumulation of heat simultaneously takes place with the great accumulation of light. That zone of this cover whose upper limit is struck by the rays, passing by the margin of the mirror, is provided with a reflecting coat $k$. The rays striking this coat are transmitted by it to the mirror $d$, while otherwise they would neither strike the luminous field nor would they be utilized for illuminating the surroundings of the luminous field. The casing $l$ of the mirror is provided with a closing disc $m$ of glass with wire reinforcement, so that in the case of breakage of this disc or the cover $j$ the patient cannot be hit by the glass fragments.

We claim:

1. Illuminating arrangement containing an operating chair or the like and an illuminating body, the said illuminating body being provided with a casing, a concave mirror fixed in the casing, the reflecting surface of the concave mirror being a surface of rotation having a continuously curved meridional curve, and a source of light disposed in the casing and lying on the axis of rotation of the mirror, the mirror extending in the direction of the axis of rotation beyond the source of light, the points of intersection of the luminous rays projected by the reflecting surface of the mirror with the said axis of rotation covering a finite length of this axis, so that the pencil of reflected luminous rays has above the operating chair a narrow constriction, each element of the cross section of the narrowest place of the said constriction being illuminated by rays emanating from points of at least two meridians of the mirror situated on both sides of the source of light.

2. Illuminating arrangement containing an operating chair or the like and an illuminating body, the said illuminating body being provided with a casing, a concave mirror fixed in the casing, the reflecting surface of the concave mirror being a surface of rotation having a continuously curved meridional curve, a source of light disposed in the casing and lying on the axis of rotation of the mirror, the points of intersection of the luminous rays projected by the reflecting surface of the mirror with the said axis of rotation covering a finite length of this axis, and a cover of heat-absorptive glass enclosing the source of light.

3. Illuminating arrangement containing an operating chair or the like and an illuminating body, the said illuminating body being provided with a casing, a concave mirror fixed in the casing, the reflecting surface of the concave mirror being a surface of rotation having a continuously curved meridional curve, a source of light disposed in the casing and lying on the axis of rotation of the mirror, the points of intersection of the luminous rays projected by the reflecting surface of the mirror with the said axis of rotation covering a finite length of this axis, and a cover of heat-absorptive glass enclosing the source of light, that zone of this cover, facing the vertex of the mirror, the limit of which is struck by the rays passing by the margin of the mirror, being spherical and having its centre in the source of light and being reflecting.

WALTHER BAUERSFELD.
HANS HARTINGER.